(12) United States Patent
Fujibayashi et al.

(10) Patent No.: US 6,735,646 B2
(45) Date of Patent: May 11, 2004

(54) COMPUTER SYSTEM USING DISK CONTROLLER AND OPERATING SERVICE THEREOF

(75) Inventors: Akira Fujibayashi, Sunnyvale, CA (US); Kazuhisa Fujimoto, Kokubunji (JP); Hiroki Kanai, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 09/911,544

(22) Filed: Jul. 25, 2001

(65) Prior Publication Data

US 2002/0169901 A1 Nov. 14, 2002

(30) Foreign Application Priority Data

May 9, 2001 (JP) ........................................ 2001-138424

(51) Int. Cl.⁷ .............................................. G06F 13/14
(52) U.S. Cl. .................... 710/38; 709/224; 370/229; 370/351
(58) Field of Search ............................ 710/38; 370/351, 370/229; 709/224

(56) References Cited

U.S. PATENT DOCUMENTS

| 5,233,604 | A | * | 8/1993 | Ahmadi et al. ................ 370/60 |
| 5,912,894 | A | * | 6/1999 | Duault et al. ................ 370/433 |
| 6,044,075 | A | * | 3/2000 | Le Boudee et al. ......... 370/351 |
| 6,570,867 | B1 | * | 5/2003 | Robinson et al. ........... 370/351 |

* cited by examiner

Primary Examiner—Abdelmoniem Elamin
(74) Attorney, Agent, or Firm—Reed Smith LLP; Stanley P. Fisher, Esq.; Juan Carlos A. Marquez, Esq.

(57) ABSTRACT

When there is an access passing between unit disk controllers, the band of a mutual connecting network must be very large in order to exhibit the performance sufficiently, so that the cost is increased. In the present invention, the access number of a logical volume is monitored, the change of an access path is suggested to an upper class device, and the logical volume is moved or copied to each unit disk controller, so that the mutual connecting network is used mainly for copy of the logical volume, thereby reducing the necessary band.

21 Claims, 22 Drawing Sheets

FIG. 6

| Accessing Logical Path | Host Side Path | Disk Side Path | Logical Volume Number |
|---|---|---|---|
| 71 | 51 | 61 | #0000000( Corresponding to LVOL #000 of Unit Disk Controller #0) |
| 72 | 52 | 63 | #N−m( Corresponding to LVOL #001 of Unit Disk Controller #n) |
| ⋮ | ⋮ | ⋮ | ⋮ |
| 73 | 53 | 64 | #N−m+2( Corresponding to LVOL #003 of Unit Disk Controller #n) |
| 74 | 54 | 65 | #N−m−1( Corresponding to LVOL #000 of Unit Disk Controller #n) |
| 75 | 56 | 66 | #N−m+1( Corresponding to LVOL #002 of Unit Disk Controller #n) |

Summing Up Period : 1WEEK

| Logical Volume Number (LVOL#) | Total Access Number (x10³) | | Access Number through Channel Path in Unit Disk Controller (x10³) | Access Number through Channel Path bridging other Unit Disk Controller (x10³) | | | | |
|---|---|---|---|---|---|---|---|---|
| | | | | #00 | #01 | ......... | #N-1 | #N |
| #0000000 | R | 8000 | 200 | 120 | | | 1200 | 1200 |
| | W | 2000 | 800 | 200 | 200 | | 200 | 200 |
| #0000001 | R | 5000 | 2000 | 400 | | | 400 | 400 |
| | W | 5000 | 2000 | 1000 | 1000 | | | |
| #0000002 | R | 8000 | 2400 | 1000 | | | | 1000 |
| | W | 2000 | 600 | | 100 | | 300 | |
| #0000003 | R | 5000 | 2500 | | | | 1000 | 1000 |
| | W | 5000 | 2500 | | | | 1000 | 1000 |
| #0000004 | R | 6000 | 3600 | 1000 | | | 1000 | 1000 |
| | W | 4000 | 2400 | | | | 1000 | 1000 |
| #0000005 | R | 7000 | 1400 | 1000 | 100 | | 1000 | |
| | W | 3000 | 600 | | | | 50 | 1000 |
| ... | | ... | ... | ... | ... | | ... | ... |

INFORMATION
Recommended to copy Logical Volume Number A to Logical Volume Number B.
Start up Copy Execute Wizard?

Yes(Y)   No(N)

INFOMATION

Recommended to add Path #N+1 so that Logical Path from SAN Switch to Logical Volume #N−M of Unit Disk Controller #n is added.

Yes(Y)    No(N)

INFOMATION

Recommended to change Device Side Path #1
Accessing to Logical Volume #N to Device Side
Path #N−2.

Yes(Y)    No(N)

INFOMATION

Logical Path Mapping is changed.

Yes(Y)

INFOMATION

Logical Path Mapping is not changed.

Yes(Y)

Summing Up Period : 19.00-23.00 @DAY

| Logical Volume Number (LVOL#) | Total Access Number ($\times 10^3$) | | Access Number through Channel Path in Unit Disk Controller ($\times 10^3$) | Access Number per each Logical Path ($\times 10^3$) | | | | | | |
|---|---|---|---|---|---|---|---|---|---|---|
| | | | | #0 | #1 | #2 | ••• | #N-2 | #N-1 | #N |
| #0000000 | R | 8000 | 3200 | 3200 | | | | | | |
| | W | 2000 | 2000 | 2000 | | | | | | |
| #0000001 | R | 5000 | 0 | | | | | | | |
| | W | 5000 | 0 | | | | | | | |
| #0000002 | R | 8000 | 0 | | | | | | | |
| | W | 2000 | 0 | | | | | | | |
| ••• | | | ••• | | | ••• | | | | |
| #N-2 | R | 0 | 0 | | | | | | | |
| | W | 0 | 0 | | | | | | | |
| #N-1 | R | 6000 | 5200 | | | 800 | | 8000 | | |
| | W | 4000 | 4000 | | | | | | | |
| #N | R | 7000 | 500 | | | 6500 | | 2000 | 500 | |
| | W | 3000 | 100 | | | 2900 | | | 100 | |

INFOMATION

Recommended to move Logical Volume C to Logical Volume D.
Start up Volume Move Execute Wizard?

1503 — Yes(Y)    No(N) — 1502

Recommended to copy Logical Volume E to Logical Volume F.
Start up Volume Copy Execute Wizard?

Yes(Y)    No(N)
1504      1505

INFOMATION

Logical Volume C is moved to Logical Volume D.

1603 — Yes(Y)

Logical Volume E is copied to Logical Volume F.

Yes(Y)

1604

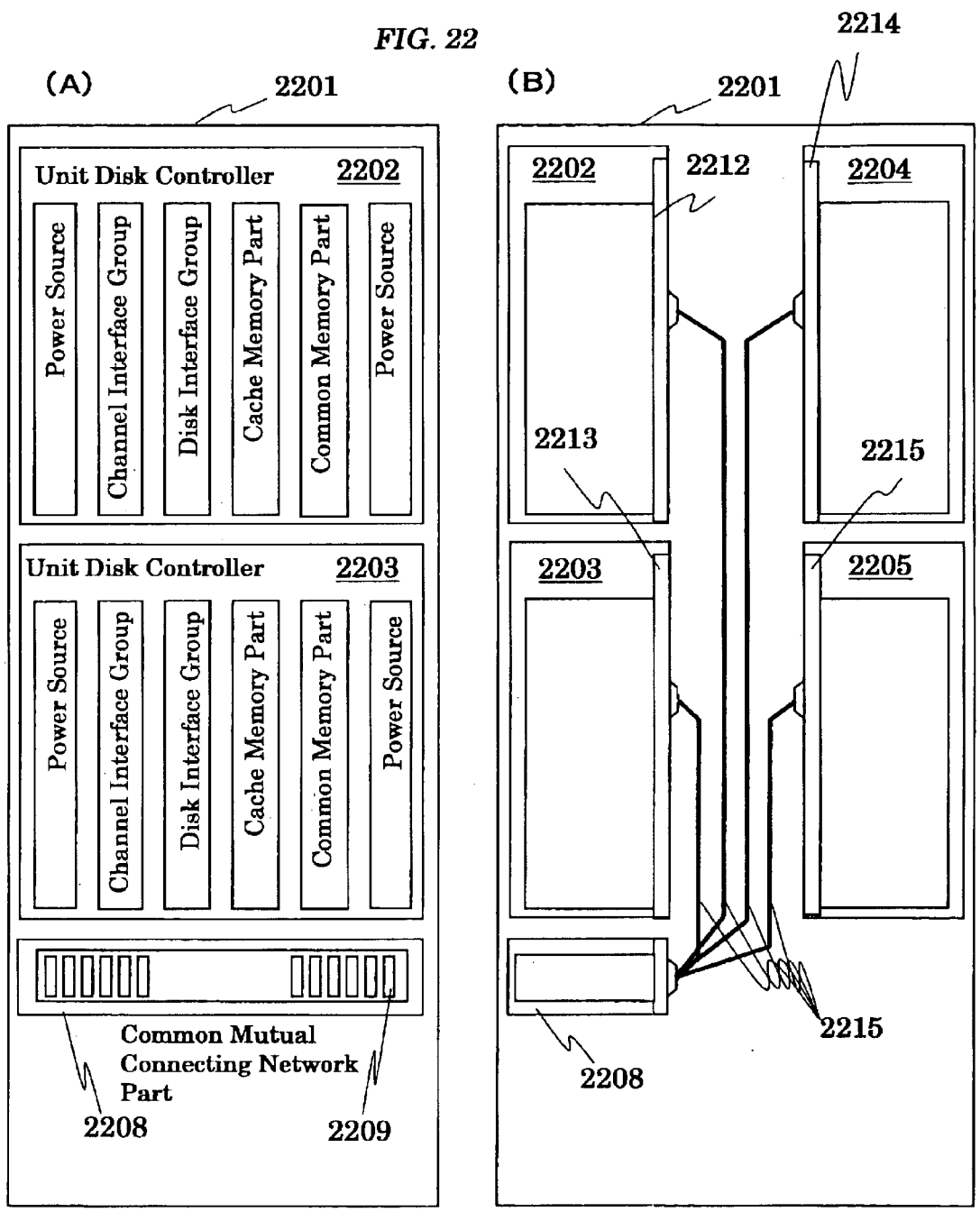

COMPUTER SYSTEM USING DISK CONTROLLER AND OPERATING SERVICE THEREOF

BACKGROUND OF THE INVENTION

The present invention relates to a computer system using a disk controller of a disk array for storing data into a plurality of disk devices and an operating service thereof.

Currently, a data center or the like handling a large volume of data introduces various storage devices such as a large disk array connected to a mainframe as well as a small and medium disk array connected to a tape backup device or an open system servers, and stores information in each of the devices. At present, it is hard to say that the stored information is organically strongly linked to the respective devices. Thus, active has been a movement to introduce a concept SAN (Storage Area Network), and to connect various storage devices through the network, thereby managing information. A large data center has used a large disk array to build a storage system which has high reliability, high performance and high functionality. With SAN, a larger storage system than ever is being built in addition to a small and medium disk array.

On the other hand, in the future, a small and medium disk array will be required to have high performance and high reliability. A current disk array will need scalably supporting from a small storage system such as SOHO to a large storage system such as a bank, and also a service capable of operating this effectively.

A prior art disk array centers on a disk controller as shown in FIG. 1. The disk controller has a plurality of channel interface (hereinafter, channel IF) parts 103 for executing data transfer between a host computer 101 and a disk controller 109, a plurality of disk interface (hereinafter, disk IF) parts 104 for executing data transfer between a magnetic disk device 102 and the disk controller 109, a common memory part 107 for storing data read and written between the channel IF and the disk channel IF, and a cache memory part 108 for storing control information on the disk array controller 109 (for example, control information on data transfer between the channel IF part 103 and the common memory part 107). The channel IF part 103, the disk IF part 104 and the common memory part 107 are connected by a mutual connecting network 105. The channel IF part 103, the disk IF part 104, and the common memory part 108 are also connected by a mutual connecting network 106. The mutual connecting network herein means all connection means such as a switch, loop, and bus. Herein, the numeral 412 denotes an SVP (Supervise Processor) part and, as described later, collects information on the access number per each channel path number of information transmission between the host computer 101 and the disk controller 109.

When one disk controller is formed by such a construction, scalability is a form of adding a component to its minimum construction as a basic device, i.e., of sequentially adding an optional component for extension. In other words, its minimum construction needs to have an extension mechanism for adding an optional component up to its maximum construction, and its small construction is also provided with a mechanism required for extension. They are unnecessary mechanisms when operated by its basic construction. The device cost can be inevitably relatively high for its basic construction. Further, to meet speeding up of a host computer and improvement in connectivity (an increase in the number of connectable host interfaces), it is also necessary to respond to speeding up of the connection mechanism for the extension components and improvement in extensionality (an increase in the number of the extendable components). The cost is increased, so that there is a high possibility that the cost may be relatively high for its basic construction.

With respect to this, as shown in the overview of FIG. 2, an SAN (Storage Area Network) environment using a disk array makes a system construction efficient. Host computers 101 are connected through a common mutual connecting network 210 to a disk controller 109. The disk controller has a plurality of channel IF parts 103, a plurality of disk IF parts 104, a plurality of common memory parts 107, and a plurality of cache memory parts 108, which are connected to mutual connecting networks 105 and 106, respectively. The disk IF part is connected to a plurality of disk devices 102. The disk controller 109 and the disk device 102 connected thereto function as a disk array. The common mutual connecting network 210 can connect many kinds of storage devices, and can also connect a magnetic tape memory 212. Specifically, there are considered every kind of network such as a fiber channel switch, loop and LAN. In such a form, for example, tens of or hundreds of small disk array devices are connected to from an aggregate of a large number of logical volumes, which can show the system to an upper class host computer. It is possible to realize a large volume equal to that of a prior art large disk array with high availability and high reliability as well as high function such as logical volume copy between the disk controllers, as shown by a path 211 in the drawing. However, there is the problem that the small disk array device does not pursue high availability and high reliability of the large disk array. On the other hand, there is a merit in cost because of the aggregate of inexpensive small disk arrays. Also herein, the numeral 412 denotes an SVP (Supervise Processor) part, which collects information on the access number per each channel path number of information transmission between the host computer 101 and the disk controller 109.

As shown in FIG. 3, as a similar construction, a unit disk controller 309 functions as a disk array by consisting of a disk controller provided with a mutual connecting networks 105 and 106 to connect a channel IF part 103 and a disk IF part 104 for connecting host computers 101 and disk devices 102, respectively, a common memory part 107, and a cache memory part 108, and is smaller than the disk controller shown in FIGS. 1 and 2. A plurality of the unit disk controllers can be connected by a common mutual connecting network 310 so as to construct a disk array functioning as a disk controller 315 on the whole. In this case, the unit disk controller is about ¼ to ½ times the prior art disk controller and is mounted in a compact manner. The cost can be thus low. Further, the common mutual connecting network 310 as its center part has a minimum band required. The cost of the entire device can be reduced. Also herein, the numeral 412 denotes an SVP (Supervise Processor) part, which collects information on the access number per each channel path number of information transmission between the host computer 101 and the disk controller 315, more strictly, all the unit disk controllers 309.

There can be a system integrating the system construction shown in FIGS. 2 and 3, although the illustration thereof is omitted. In other words, the host computers 101 in FIG. 3 are connected by the common mutual connecting network 210 shown in FIG. 2. The host computer not through the unit disk controller directly connected to itself can access a unit disk controller directly connected to other host computer. Consequently, it is unnecessary to pass through the mutual connecting network between the unit disk controllers, whereby access can be improved.

SUMMARY OF THE INVENTION

The unit disk controllers of the small construction functioning as a disk array device are connected by the mutual connecting network so as to realize scalability up to the large construction. It is thus unnecessary to previously construct the mechanism for extension in the device, thereby reducing the initial cost. In view of the relation between the host computer and the disk, the path of the mutual connecting network between the controllers may be unbalanced, so that this may inhibit the efficient operation of the system. Naturally, one solution is that a band necessary for the mutual connecting network between the unit disk controllers is large. Preparation of a large band for unbalance of a specific path can reduce the merit of lowering the initial cost to provide a system for connecting the unit disk controllers by the mutual connecting network.

Further, the path and power source of the mutual connecting network between the controllers must be considered to be redundant. The redundant path and redundant power source for the mutual connecting network between the controllers are prepared, resulting in merely an increase in the cost.

An object of the present invention is to provide a computer system and an operating service thereof, which can reduce data transfer between unit disk controllers where possible so as to reduce a band necessary for a mutual connecting network between the unit disk controllers in a disk controller with the construction described above. Further, if necessary, the present invention proposes redundancy suitable for a power supply source to the mutual connecting network.

To achieve the foregoing object, the present invention, in order to enhance the probability that an access path used by a host computer and a volume accessed are present in the same unit disk controller, monitors the access status, recommends to an upper class device connected to use an optimum path, based on the access information extracted, and displays or notifies, to the system manager, information for recommending to move or copy the logical volume frequently passing between the unit disk controllers, via a supervise processor or a web terminal for the manager. In addition, they can be executed automatically. In this way, the entire device is controlled so that sending and receiving data between the unit disk controllers are done by mainly volume copy or move, thereby reducing the band necessary for the mutual connecting network.

The power supply to the common mutual connecting network is redundant. The common mutual connecting network is necessary only when two or more unit disk controllers are present. The power sources of a plurality of the unit disk controllers are used to provide redundant power source, thereby reducing an increase in unnecessary power source.

BRIEF DESCRIPTION OF THE DRAWINGS

FIG. 6 is a diagram showing one example of mapping information of the paths of a mapping table managed by an SAN manager in FIG. 5;

FIG. 9 is a diagram showing one example of INFORMATION to a system operator provided by the present invention corresponding to the access of a host computer via a common mutual connecting network to the logical volume of a unit disk controller;

FIG. 10 is a diagram showing another example of INFORMATION to a system operator provided by the present invention;

FIG. 11 is a diagram showing an example in displaying a response to the result obtained by operating the "Yes (Y)" button for receiving INFORMATION shown in FIGS. 7, 9 and 10;

FIG. 12 is a diagram showing an example in displaying a response to the result obtained by operating the "No (N)" button for not receiving INFORMATION shown in FIGS. 7, 9 and 10;

FIG. 14 is a diagram showing one example of access status summing up results in FIG. 13;

FIG. 15 is a diagram showing an example of INFORMATION recommending path change corresponding to the summing up results in FIG. 14;

FIG. 16 is a diagram showing an example of INFORMATION reporting a result after performing the process corresponding to the result instruction by operating the "Yes (Y)" button for receiving INFORMATION in FIG. 15;

FIG. 22 is a diagram showing one example of a method for mounting redundant power sources of the construction shown in FIG. 21.

DESCRIPTION OF THE PREFERRED EMBODIMENT

Embodiments of a disk controller provided by the present invention and a method for mounting the same will be described hereinafter in detail by showing the drawings with reference to the embodiments.

Figure 4:
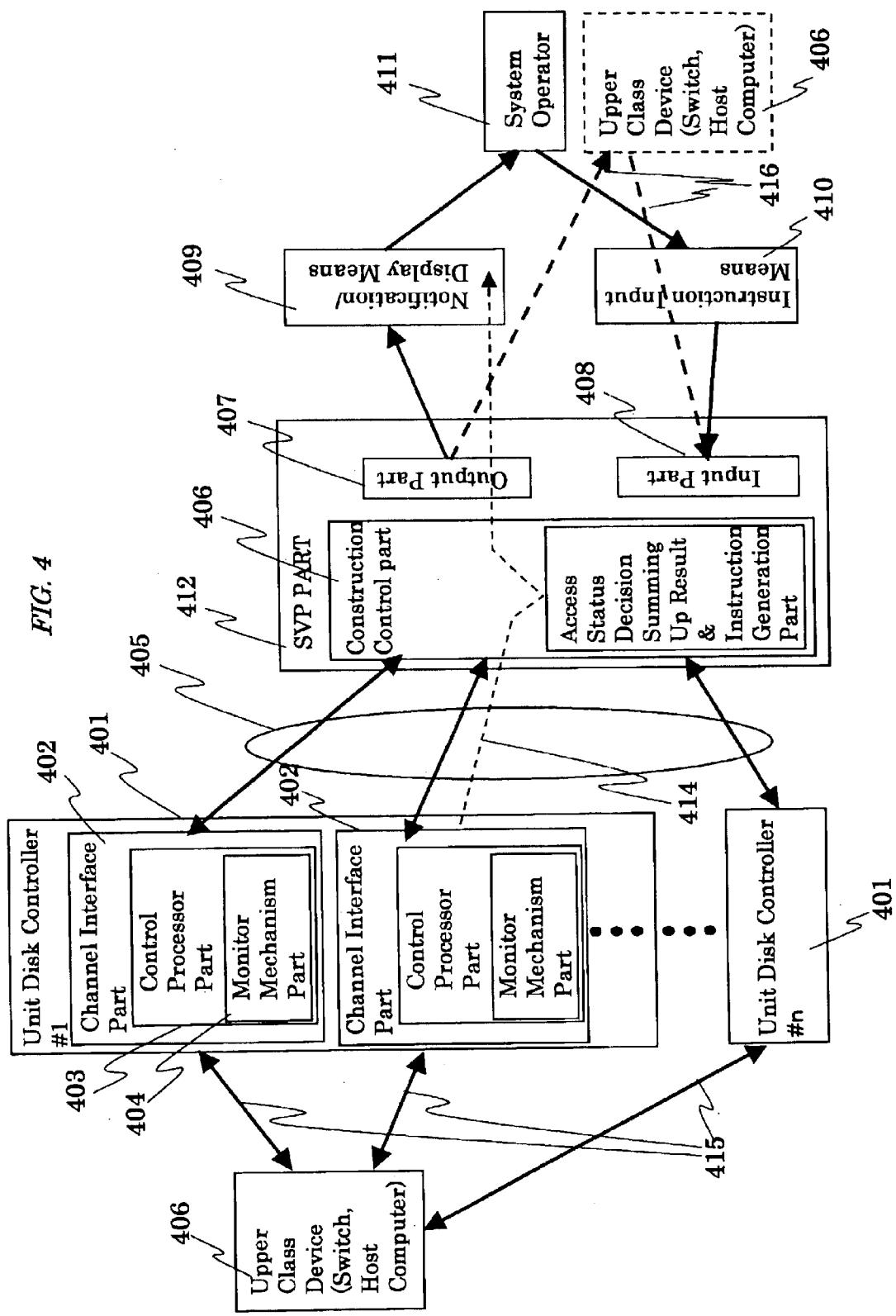
FIG. 4 is a diagram showing the overview of a logical volume access number monitor mechanism for permitting the service of the present invention.

FIG. 4 is a diagram showing the overview of a logical volume access number monitor mechanism for permitting the service of the present invention. Herein, the embodiment will be described without specifying notification means, display means, and instruction input means to a system operator, an upper class device such as u switch, and a host computer. In execution, a CRT is used for display, notification is made by a mail through the network to an operator terminal, or display is done through a browser on the operator terminal.

Further, a fiber channel or Gigabit Ethernet, considered as an interface connecting a disk controller to a switch or host computer is provided with a construction manage protocol such as SNMP. Using this permits mutual transmission of manage information between the disk controller and the upper class device. As the instruction input means, it is possible to apply various methods such as input means using a keyboard or browser-based input means using a network.

An SVP (Supervise Processor) part 412 has a construction control part 406, an output part 407, and an input part 408, and performs the construction information manage or control of the entire disk array device. Between the SVP (Supervise Processor) part 412 and a system operator 411, notification/display means 409 and instruction input means 410 are provided so as to notify/display a signal of the output part 407 of the SVP (Supervise Processor) part 412 to the system operator 411, so that the input part 408 can receive the instruction from the system operator 411. The construction control part 406 receives construction information from the disk array and instructs the disk array to change the construction. In addition, the SVP part 412 has means 415 for transmitting information each other so as to execute to a channel IF part 402, through the host computer IF, sending and receiving manage information of the SNMP protocol described previously or instruction to change the construction. In the present invention, a control processor part 403 in the channel IF part 402 collects at fixed intervals the access logical volume number per each channel collected by a monitor mechanism part 404 and the use number thereof. The collected data are collected through monitor information summing up means 405 into the SVP part 412. The SVP part 412 collects information on the access number per each channel path number in all unit disk controllers 401. The monitor mechanism part 404 may be realized by either a control program executed on the processor or hardware mounted as the channel IF part.

In this way, monitoring information from the respective channels is summed up. Through a flow 414 of information transmission indicated by the broken line in the drawing, the SVP part 412 decides the information summed up, so that the information is notified or displayed to the system operator therefrom. Notification and signal input can be also done to the upper class device 406, in place of the system operator 411. In this case, the SVP part 412 exchanges information notified or displayed to the system operator between the SVP part 412 and the upper class device 406 through an interface 416 connected to the upper class device 406, as indicated by the thick broken line in the drawing. Naturally, in addition to this, needless to say, various routes can be adopted. In the present invention, it is unnecessary to limit the physical position for mounting the IF sending and receiving manage information.

Figure 5:
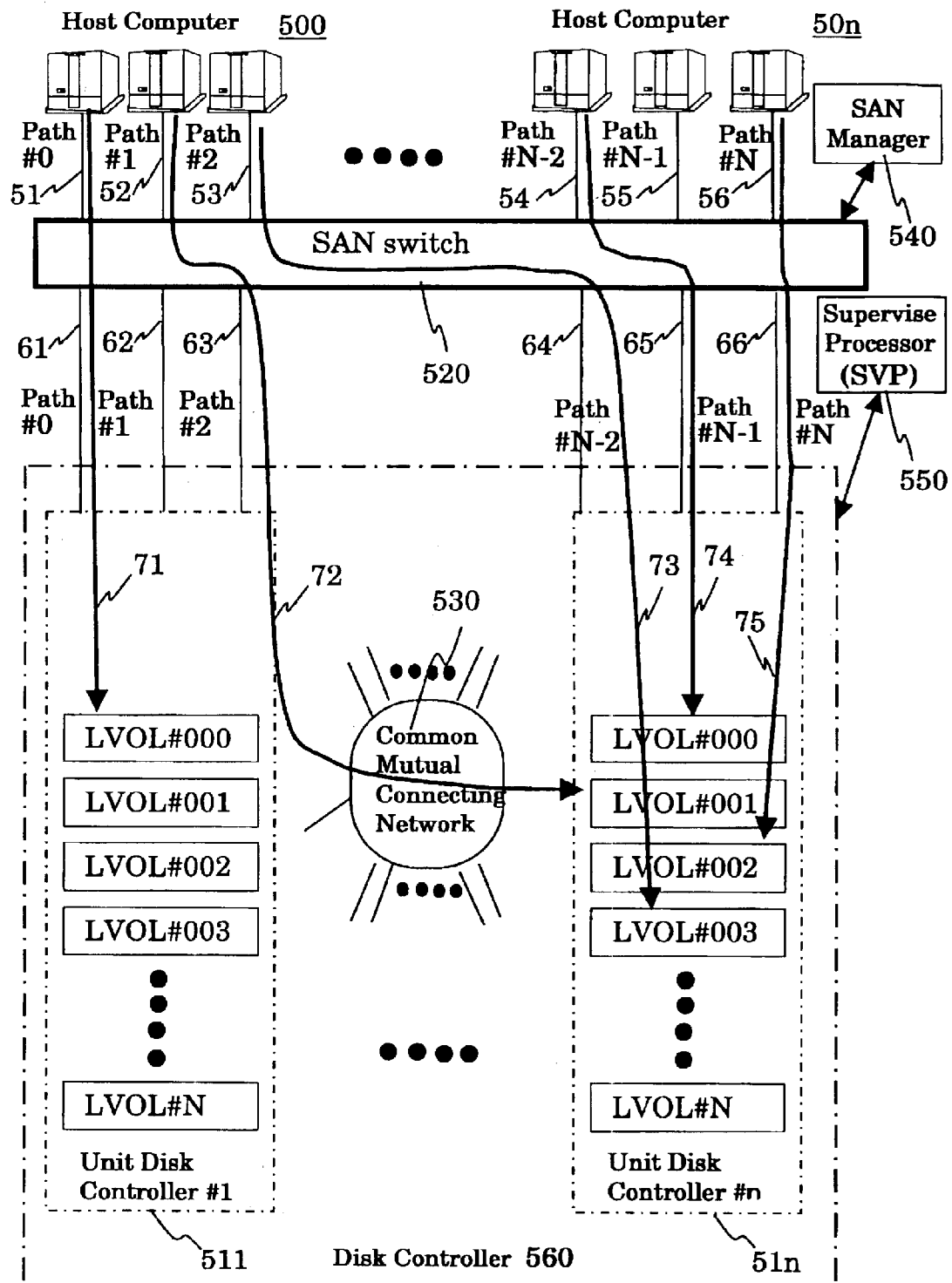
FIG. 5 is a diagram showing a system construction for more specifically explaining summing up of access data between a host computer and a disk by an SVP (Supervise Processor) part.

FIG. 5 is a system construction diagram for more specifically explaining summing up access data between a host computer and a disk by the SVP (Supervise Processor) part 412, in which the access between the host computer and the logical volume is schematically shown. Host computers 500, ..., 50n are connected through an SAN switch 520 to a disk controller 560. The disk controller 560 has unit disk controllers 510, ..., 51n. Logical volumes #000-#N are provided in each of the unit disk controller. The unit disk controllers are linked by a common mutual connecting network 530. Logical volumes are displayed so as to be constructed in the unit disk controller of the disk controller. This is because the disk device cannot be seen from the host computer, but the logical volume as an access unit can only be seen.

The access between the host computer and the logical volume for each logical path is as follows. Logical volume LVOL#000 of a unit disk controller #0 is accessed using a logical path 71 passing through a path 51, the SAN switch 520, and a path 61. Logical volume LVOL#001 of a unit disk controller #n is accessed using a logical path 72 passing through a path 52, the SAN switch 520, a path 63, and the common mutual connecting network 530. Logical volume LVOL#000 of the unit disk controller #n is accessed using a logical path 74 passing through a path 54, the SAN switch 520, and a path 65. Logical volume LVOL#002 of the unit disk controller #n is accessed using a logical path 75 passing through a path 56, the SAN switch 520, and a path 66. Logical volume LVOL#003 of the unit disk controller #n is accessed using a logical path 73 passing through a path 53, the SAN switch 520, and a path 64.

A plurality of the host computers 500-50n and the disk controller 560 are connected through the SAN switch 520. In order that the host computer needs not to be conscious of the physical connection status of the device under the SAN switch, the SAN switch 520 manages a combination of host side paths #0 to #N 51 to 56 and disk side paths #0 to #N 61 to 66 as a logical access path, and the mapping table thereof is managed by the SAN manager 540. The SAN manager is actually manage software and is mounted somewhere (including the host computer) on the SAN switch 520. In the present invention, the SAN manager 540 can be mounted in any position. A special hardware may be also connected to the SAN switch 520.

At this time, the mapping information of the paths of the mapping table managed by the SAN manager 540 is as shown in FIG. 6. FIG. 6 focuses only on the logical path explained in FIG. 5. The mapping table provides a listing of the relation of correspondence of path numbers of all the logical paths connecting the host side path number (physical path) and the disk side path number (physical path) with logical volume numbers accessed by the logical path.

Figure 7:
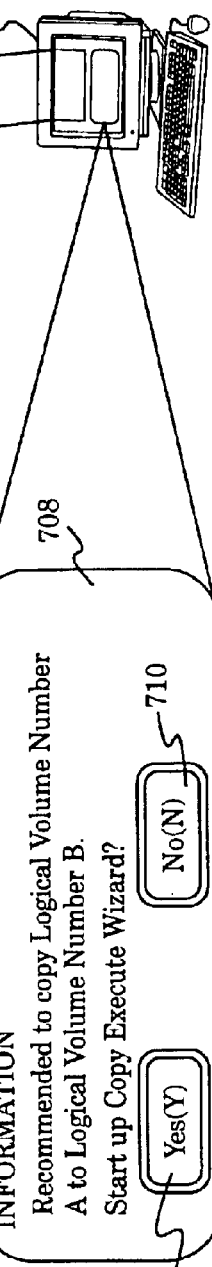
FIG. 7 is a diagram showing a display example indicating in the order of logical volume number the results of the total access number to logical volumes which is summed up by an supervise processor including the SVP (Supervise Processor) part and the access number per each channel path number.

FIG. 7 is a diagram showing a display example indicating in the order of logical volume number the results of the total access number to logical volumes in which the accesses as explained in FIGS. 5 and 6 are summed up by a supervise processor 550 including the SVP (Supervise Processor) part 412 explained in FIG. 4, and the access number per each channel path number. For example, the accesses are summed up as in a table 706, and then are, displayed on a display 707 as the output part of the supervise processor 550 to be notified to the operator. In the table 706, the numeral 701 denotes a summing up period, the numeral 702 denotes all the logical volume numbers constructing a system, the numeral 703 denotes a total access number to each of the logical volumes (by read (R) and write (W)), the numeral 704 denotes an access number passing through the channel path in the same unit disk controller in the total access number, and the numeral 705 denotes access from the channel of other unit disk controller, i.e., an access number passing through the common mutual connecting network 530. The channel path in the numeral 705 is a path between the SAN switch 520 and the unit disk controllers 511-51n, by the example of FIG. 5.

For example, see the access number of read (R) of logical volume #0000000. The access number passing through the channel path in the same unit disk controller is only 200× $10^3$. The access from the channel of other unit disk controller passing through channel paths #N−1 and #N, i.e., the access number passing through the common mutual connecting network 530 is large and 1200×$10^3$. Considering this by the system construction in FIG. 5, when the logical volume #0000000 is the logical volume LVOL#000 in the unit disk controller 511 in FIG. 5, the logical volume is moved or copied to an empty logical volume in the unit disk controller 51n. It is possible to improve the access from the channel of another unit disk controller passing through the channel paths #N−1 and #N.

FIG. 7 shows in its lower stage an example of a message 708 for notifying a message on such improvement of access to the system operator 411. Herein, generally, a message for recommending to copy a logical volume A to a logical volume B is displayed on the display 707 as the output part of the supervise processor 550. The format of the display is GUI (Graphic User Interface) using a window. This notification displays the access monitoring summing up result, and is a message both to recommend to copy the logical volume copy logical volume number N to the logical volume under the unit disk controller number N and to inquire whether the automatic instruction mechanism (so-called wizard) for the volume copy execution procedure is started up or not. To the inquiry, the automatic instruction mechanism for the volume copy procedure can be executed by displaying the "Yes (Y)" button 709 and "No (N)" button 710 for instruction to click the "Yes (Y)" using a pointing device such as a mouse or press the "Y" of the keyboard.

Needless to say, the system is constructed so that how the logical volume is allocated to the host computer or whether the logical volume is empty or not can be seen by referring the logical volume table by all the host computers. When the logical volume is moved or copied, the table is naturally updated corresponding thereto. The table may be provided in the host computer or be provided in the disk controller. Of course, the table may be provided in the SVP part 412.

Again, referring to FIG. 5, the access to the logical volume can be improved, not only when the logical volume is moved or copied, but also when the SAN switch 520 is provided. The SAN switch is switched to change the access path so as to improve the access. In other words, the SAN switch 520 is switched to prevent the access from the path 52 of the host computer 500 through the common mutual connecting network 530 to the logical volume LVOL#001 of the unit disk controller 51n, from passing through the common mutual connecting network 530, similar to the access from the path 53 of the host computer 500 through the SAN switch 520 to the logical volume LVOL#003 of the unit disk controller 51n.

Specifically, as is understood easily by comparing the logical paths indicated by the thick line of FIG. 5, the logical path 72 accessing from the path 52 of the host computer 500 through the common mutual connecting network 530 to the logical volume LVOL#001 of the unit disk controller 51n passes through the SAN switch 520 in place of the common mutual connecting network 530, like the logical path 73, leading to improvement in the access.

The case of changing the access path for the SAN switch 520 between the disk controller 560 and the host computers 500-50n will be described hereinbelow.

Figure 8:
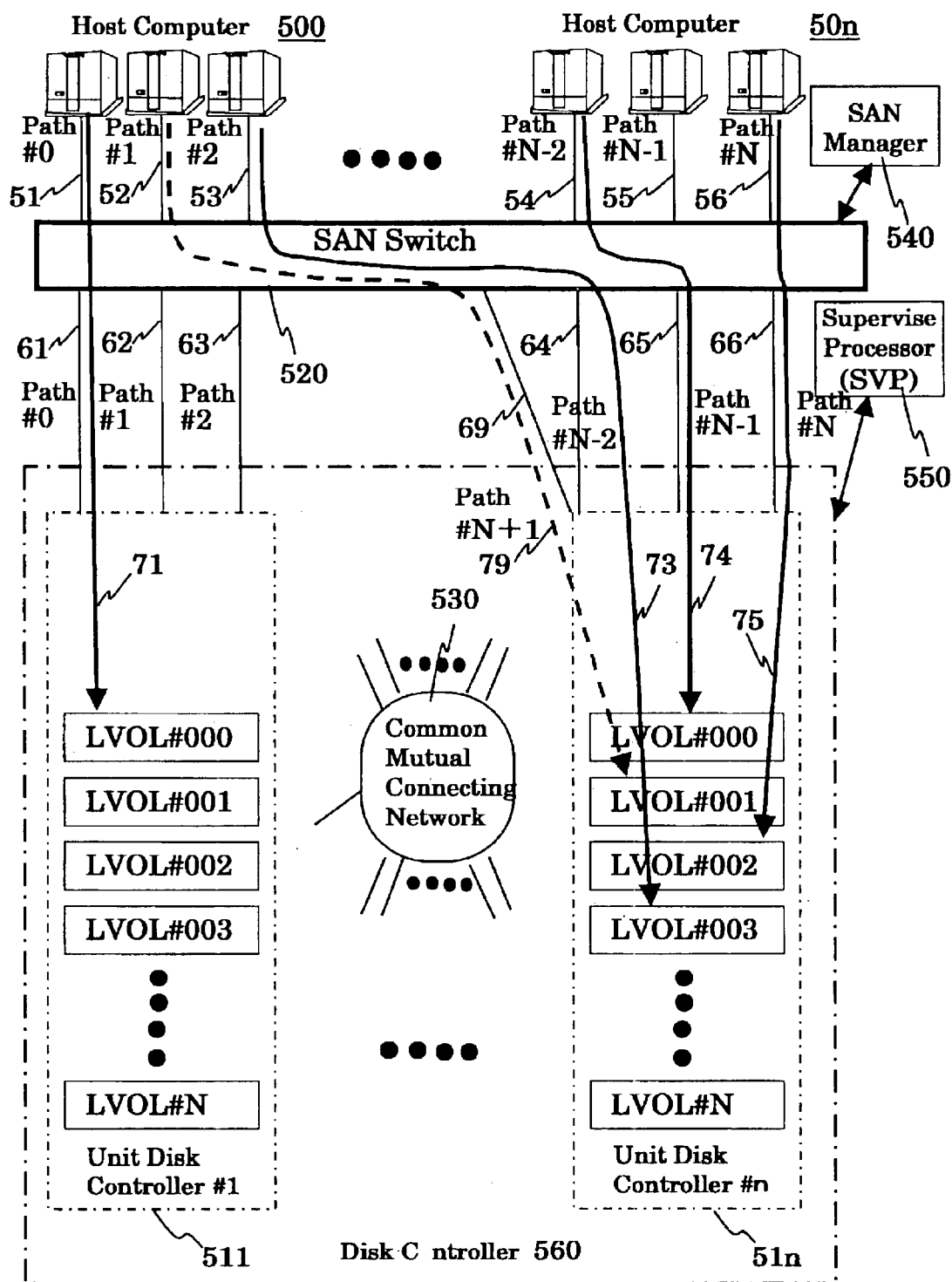
FIG. 8 is a diagram of assistance in explaining an example in switching between logical paths by an SAN switch between a disk controller and a host computer.

Referring to FIG. 8, switching of the SAN switch 520 between the disk controller 560 and the host computers 500-50n will be described specifically. FIG. 8 is similar to FIG. 5 except for the matter on the switching of the SAN switch 520.

In FIG. 5, as described previously, the access from the path 52 of the host computer 500 through the common mutual connecting network 530 to the logical volume LVOL#001 of the unit disk controller 51n is done by the logical path 72 passing through the common mutual connecting network 530. This is summed up by the supervise processor (SVP) 550, as illustrated in FIG. 7, to be decided together with the access number to be displayed to the system operator as INFORMATION as shown in FIG. 9. In this case, as is seen from FIG. 8, the access to the logical volume LVOL#001 of the unit disk controller #n is changed to the logical path passing through the SAN switch 520. In FIG. 5, the paths from the SAN switch 520 to the unit disk controller #n are all used. It is recommended that the path #N+1 be added. Naturally, in the case that there is an unused path, it is recommended that the unused path be used. When the system operator executes the recommendation, the path #N1+1 is added between the SAN switch 520 and the unit disk controller #n, as described later. Thereafter, a "Yes (Y)" button 903 is clicked by the pointing device such as a mouse, or the "Y" of the keyboard is pressed. This allows the SAN manager 540 to recognize that the path #N+1 is added between the SAN switch 520 and the unit disk controller #n, and to set a logical path 79, thereby changing the access from the path 52 to the logical volume LVOL#001 of the unit disk controller #n, to the logical path passing through the SAN switch 520. When not receiving this, a "No (N)" button 902 is clicked by the pointing device such as a mouse, or the "N" of the keyboard is pressed.

In this example, the path #N+1 must be added to perform such a procedure. When there is an empty path and change to this is suggested, the "Yes (Y)" button 903 may be simply clicked by the pointing device such as a mouse, or the "Y" of the keyboard may be simply pressed. FIG. 10 is an example of INFORMATION suggesting change to the empty path. When the path must be added, the path must be added previously. Otherwise, when only the mapping information of the paths of the mapping table managed by the SAN manager 540 is changed, the access of the host computer may be wrong. In the case of simple change, the SAN manager 540 may merely recognize the change of the path. When INFORMATION suggesting the change to the empty path as shown in FIG. 10, is received, a "Yes (Y)" button 1003 may be simply clicked by the pointing device such as a mouse, or the "Y" of the keyboard may be simply pressed. When not receiving this, a "No (N)" button 1002 is clicked by the pointing device such as a mouse, or the "N" of the keyboard is pressed.

FIGS. 11 and 12 are respectively examples in displaying a response on the display 707 as the output part of the supervise processor 550 when the "Yes (Y)" buttons 709, 903 and 1003 receiving INFORMATION shown in FIGS. 7, 9 and 10, and the "(N)" buttons 710, 902 and 1002 not receiving this, is clicked by the pointing device such as a mouse. To mean it is understood that the process is completed, the "Yes (Y)" buttons 1103 and 1203 may be pressed.

In the path change described so far, without sending the recommendation message, all are executed by report to the upper class device (switch, host computer) 406 in FIG. 4 and the function of the upper class device 406 corresponding thereto, and then, the message that such change is done may be displayed or notified as ex post facto approval.

Figure 13:
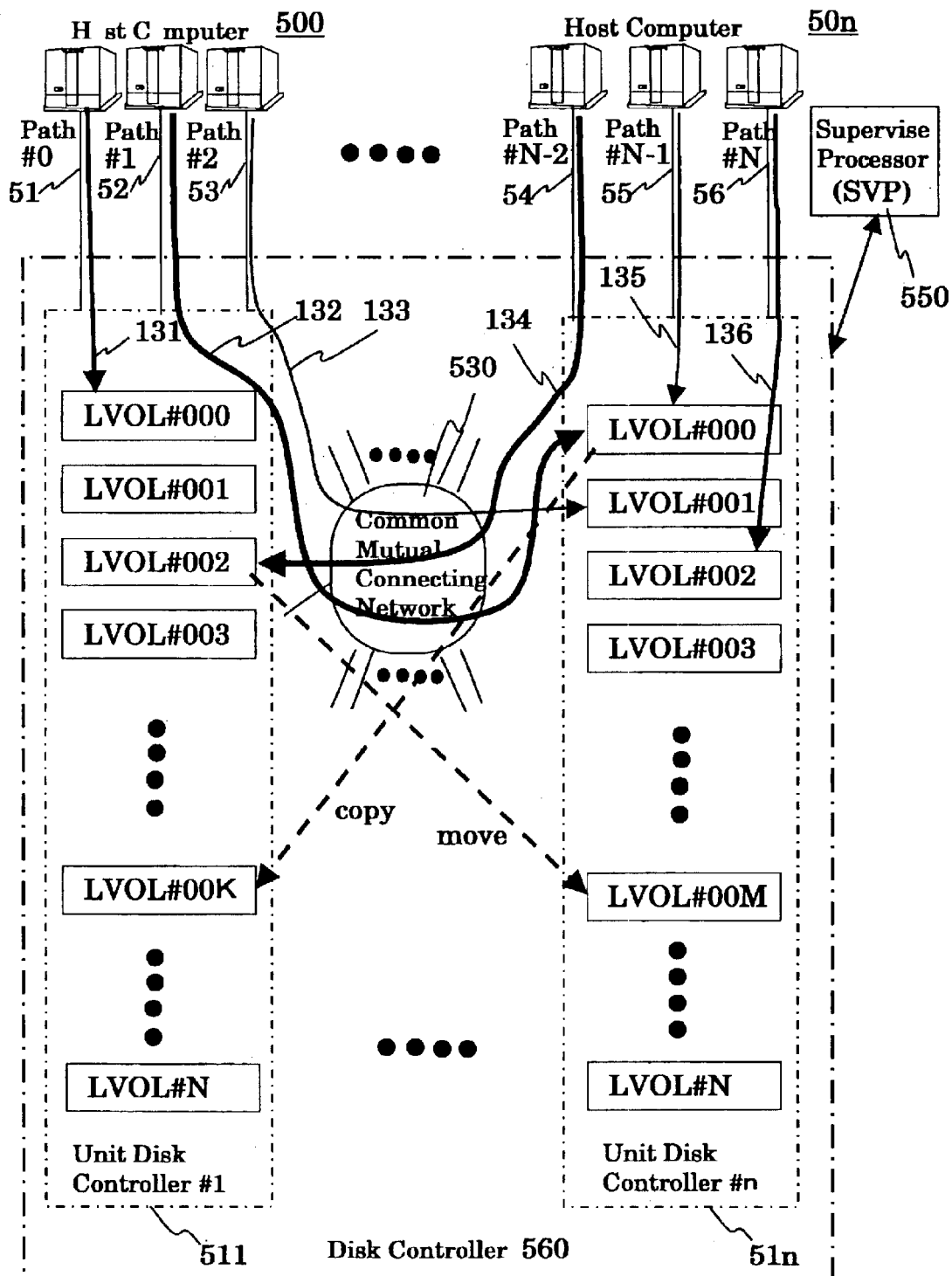
FIG. 13 is a diagram showing an example of the access between a host computer and the logical volume in each unit disk controller as a result of move or copy of a logical volume.

The logical volume move or copy will be described. FIG. 13 is a diagram showing an example of the access between the host computer and the logical volume in each of the unit disk controllers in the system constructed in the status excluding the SAN switch 520 from the system explained in FIG. 5. The host computers 500-50$n$ are connected to the unit disk controllers #1 to #N (511 to 51$n$) of the disk controller 560 using the path #0 to path #N (51 to 56). The relation between the path used by the host computer and the logical volume accessed, as shown in the drawing, indicates the status where: the path 51 accesses from a logical path 131 to logical volume LVOL#000 of the unit disk controller 511, the path 52 accesses from a logical path 132 through the common mutual connecting network 530 to logical volume LVOL#000 of the unit disk controller 51$n$, the path 53 accesses from a logical path 133 through the common mutual connecting network 530 to logical volume LVOL#001 of the unit disk controller 51$n$, the path 54 accesses from a logical path 134 through the common mutual connecting network 530 to logical volume LVOL#002 of the unit disk controller 511, the path 55 accesses from a logical path 135 to logical volume LVOL#000 of the unit disk controller 51$n$, and the path 56 accesses from a logical path 136 to the logical volume LVOL#002 of the unit disk controller 51$n$. At this time, the access status summing up results as shown in FIG. 14 are obtained, so that the SVP part 550 displays or notifies the information to the system operator or notifies the information to the host. The logical volume numbers in FIG. 14 are all passed through the logical volume numbers of all the unit disk controllers 511 to 51$n$. For example, the logical volume LVOL#000 of the unit disk controller 511 corresponds to the logical volume 0000000 of FIG. 14, and the logical volume LVOL#N of the unit disk controller 51$n$ corresponds to the logical volume N of FIG. 14. Important here is the meaning of the contents of the information shown in FIG. 14.

As the resolution of this information, there are shown the discrimination between read (R) and write access (W) and the optional period or the period of 19.00–23.00 per day is a summing up unit in the example of the drawing. In the case that, based on this information, the logical volume accessed by a certain logical path is only read through the common mutual connecting network 530, the logical volume is copied to the unit disk controller directly connected to the host computer so as to reduce the number using the mutual connecting network. In addition, when the logical volume accessed by a certain logical path is read and written through the common mutual connecting network 530, the logical volume may be moved under the unit disk controller with the smallest number to use the mutual connecting network. According to the summing up period, for example, at midnight or during early morning, when grasping the status that the read request from a certain path is abruptly increased in number, a careful process such as volume copy only for the time period can be done.

In the example of FIG. 13, as is apparent that the access number of the logical path is indicated by the thick line, the logical volume LVOL000 of the unit disk controller 51$n$ accessed by the logical path 132 may be copied to the logical volume LVOL00K of the unit disk controller 511. In addition, the logical volume LVOL002 of the unit disk controller 511 accessed by the logical path 134 may be moved to the logical volume LVOL00M of the unit disk controller 51$n$. Herein, the logical volume to be copied or moved is naturally empty. In this example, the logical volume LVOL000 of the unit disk controller 51$n$ is not moved since the logical path 135 accesses this.

FIG. 15 shows one example of a message 1501 either displayed on the SVP 550 according to the summing up results of FIG. 14 or notified to the upper class device 406, as explained in FIG. 4. In this example, the logical volume number expressed in FIG. 14 does not clearly correspond to the logical volume number of the unit disk controller of FIG. 13, so that the logical volume numbers are expressed as logical volume C, D, . . . , E. In correspondence with FIG. 13, the logical volume C in FIG. 15 corresponds to the logical volume LVOL002 of the unit disk controller 511, the logical volume D corresponds to the logical volume LVOL00M of the unit disk controller 51$n$, the logical volume E corresponds to the logical volume LVOL000 of the unit disk controller 51$n$, and the logical volume F corresponds to the logical volume LVOL00K of the unit disk controller 511.

From the summing up results of FIG. 14 showing this correspondence, it is recommended that the logical volume LVOL002 of the unit disk controller 511 be first moved to the logical volume LVOL00M of the unit disk controller 51$n$, and that the logical volume LVOL000 of the unit disk controller 51$n$ be copied to the logical volume LVOL00K of the unit disk controller 511. At this time, for the operation of move or copy, when the system operator executes the recommendation to INFORMATION as shown in FIG. 15, "Yes (Y)" buttons 1503 and 1504 are clicked by the pointing device such as a mouse, or the "Y" of the keyboard is pressed. When the system operator does not execute the recommendation, "No (N)" buttons 1502 and 1505 are clicked by the pointing device such as a mouse, or the "N" of the keyboard is pressed. Corresponding to this operation, the execution wizard is started up, and then, the execution procedure is shown automatically. The operation may be done corresponding thereto.

In the case with such move or copy, as the change or addition of the logical path is described previously, it is apparent that the operation is done by the instruction of the direct operation for the upper class device 406 shown in FIG. 4, only the result may be notified to the operator.

FIG. 16 is an example of INFORMATION 1601 reporting a result after completing the process corresponding to the result instruction by operating "Yes (Y)" buttons 1503 and 1504 in FIG. 15. This is also an example in displaying the operation result to the operator by the instruction of the above-mentioned direct operation. The system operator may operate "Yes (Y)" buttons 1603 and 1604 to mean agreement.

Figure 17:
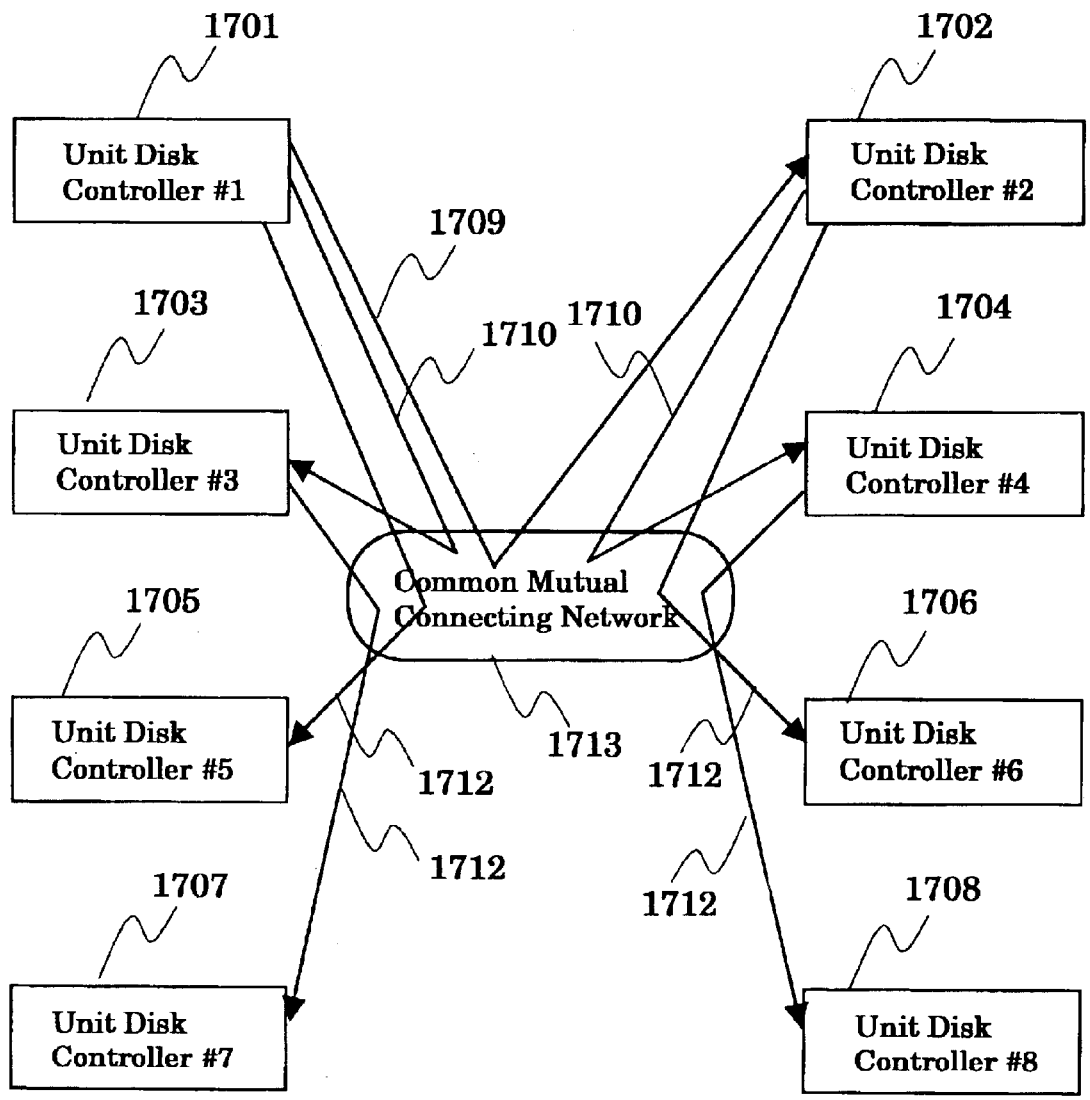
FIG. 17 is a diagram of assistance in explaining the overview of load distribution by move or copy of a logical volume using a mutual connecting network in the present invention.

FIG. 17 is a diagram of assistance in explaining the overview of load distribution by move or copy of a logical volume using the common mutual connecting network in the present invention. When copy or move of a logical volume intensively accessed is done between the unit disk controllers, it can be done efficiently as described below. For example, suppose that one of the logical volumes intensively accessed from many host computers through the common mutual connecting network is in one of the unit disk controllers. In such a case, in the present invention, all the unit disk controllers are connected through the common mutual connecting network. When the logical volume is copied to the empty logical volume of a unit disk controller useful for having the copy of the logical volume intensively accessed, the load of the common mutual connecting network is reduced to sufficiently meet a small data transfer band.

For example, suppose that one of the logical volumes intensively accessed is in a unit disk controller 1701. In this case, the unit disk controller 1701 first executes copy 1709 to a unit disk controller 1702 through a common mutual connecting network 1713. Thereafter, the unit disk controllers 1701 and 1702 execute copy 1710 to unit disk controllers 1703 and 1704. As a result, the number of the logical volumes having the contents of the logical volume intensively accessed is increased from 2 to 4. When these logical volumes further execute copy 1712, the number of the logical volumes having the contents of the logical volume intensively accessed is increased from 4 to 8. In other words, when a volume is copied to N units of the unit disk controllers, the copy is done between the unit disk controllers N−1 times. In other words, the monitor mechanism and the notification mechanism described referring to FIG. 4 execute load distribution to the access to the logical volume by copying the logical volume intensively accessed across the unit disk controller for each unit disk controller. Thus, the common mutual connecting network connecting the unit disk controllers uses its band between the unit disk controller and the unit disk controller in order to exclusively create logical volume copy.

The data transfer band is sufficient when it is equal to twice the number of the unit disk controllers having a data transfer rate between the channel interface part, the disk interface part and the cache memory part in the unit disk controller.

Figure 18:
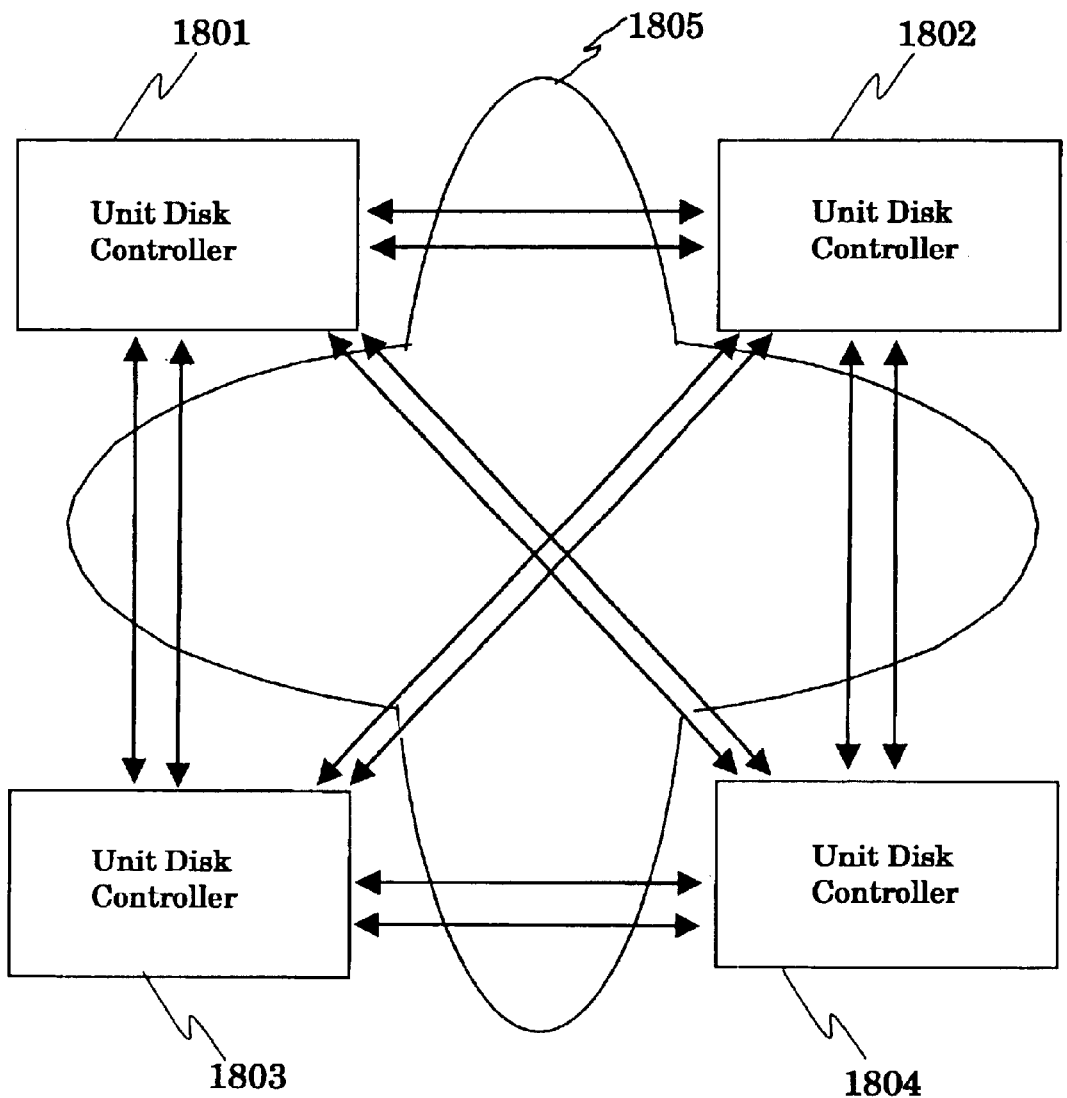
FIG. 18 is a diagram showing the overview when a common mutual connecting network connecting unit disk controllers is a simple mutual connecting path.

FIG. 18 is a diagram showing the overview when the common mutual connecting network connecting the unit disk controllers is a simple mutual connecting path. In the present invention, between the unit disk controllers, there are at least two or more paths physically different from each other and connecting the unit disk controllers. In the example of the simplest mutual connecting network, as shown in the drawing, unit disk controllers 1801 to 1804 are respectively interconnected by the two paths. A common mutual connecting network 1805 has the largest number of access paths.

Figure 19:
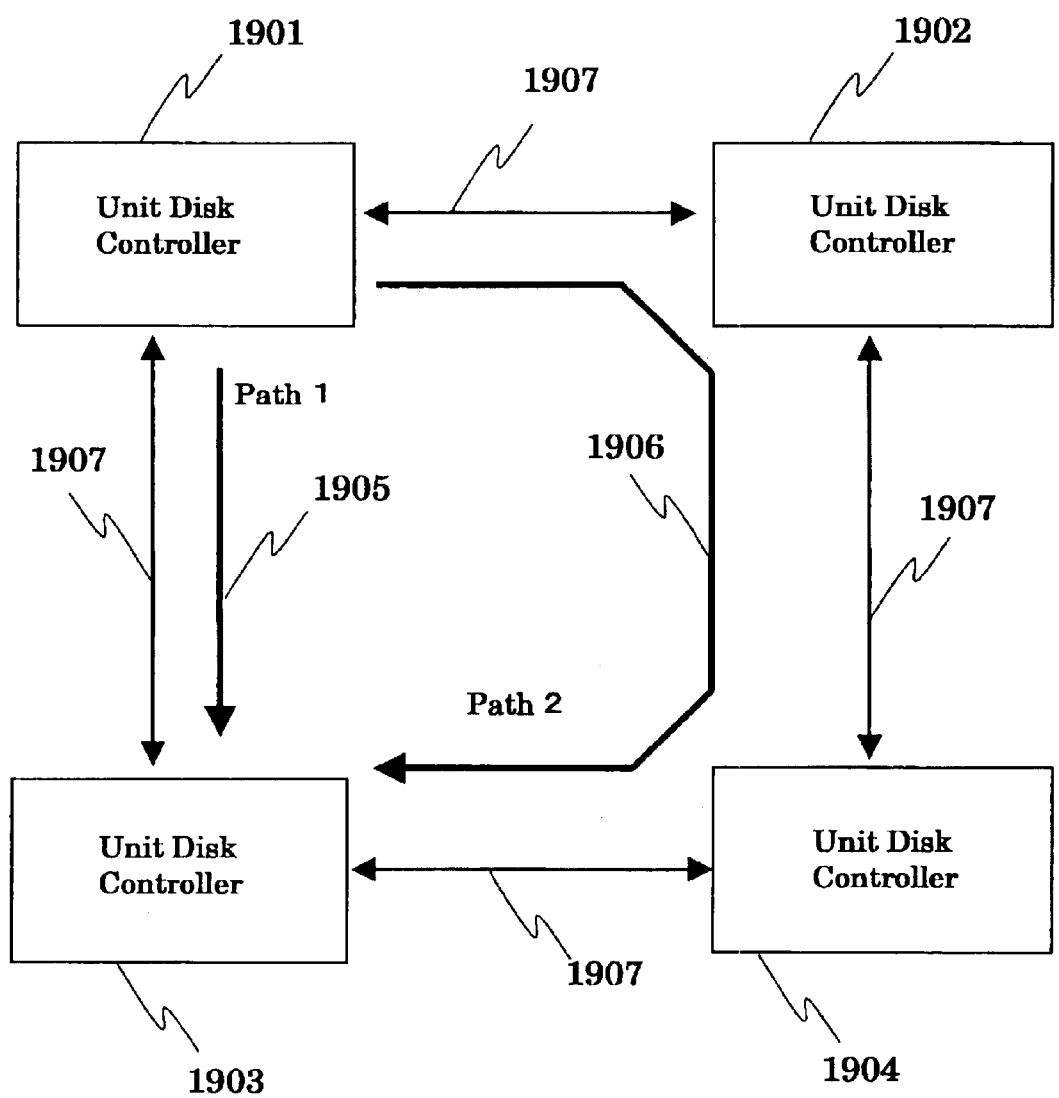
FIG. 19 is a diagram showing an example in which the number of paths is smallest in contrast to the case of FIG. 18, and unit disk controllers are connected by two or more paths physically different from each other.

FIG. 19 is an example in which the number of paths is smallest in contrast to the contrary of the case of FIG. 18, and two or more paths physically different from each other and connecting the unit disk controllers. Unit disk controllers 1901 to 1904 are respectively connected by a connecting path 1907. For example, there are two paths of the access from the unit disk controller 1901 to the unit disk controller 1903: a path 1 denoted by the numeral 1905 and a path 2 denoted by the numeral 1906 in the drawing. In such connection, the number of the paths is smallest (however, bus connection is excluded).

Figure 20:
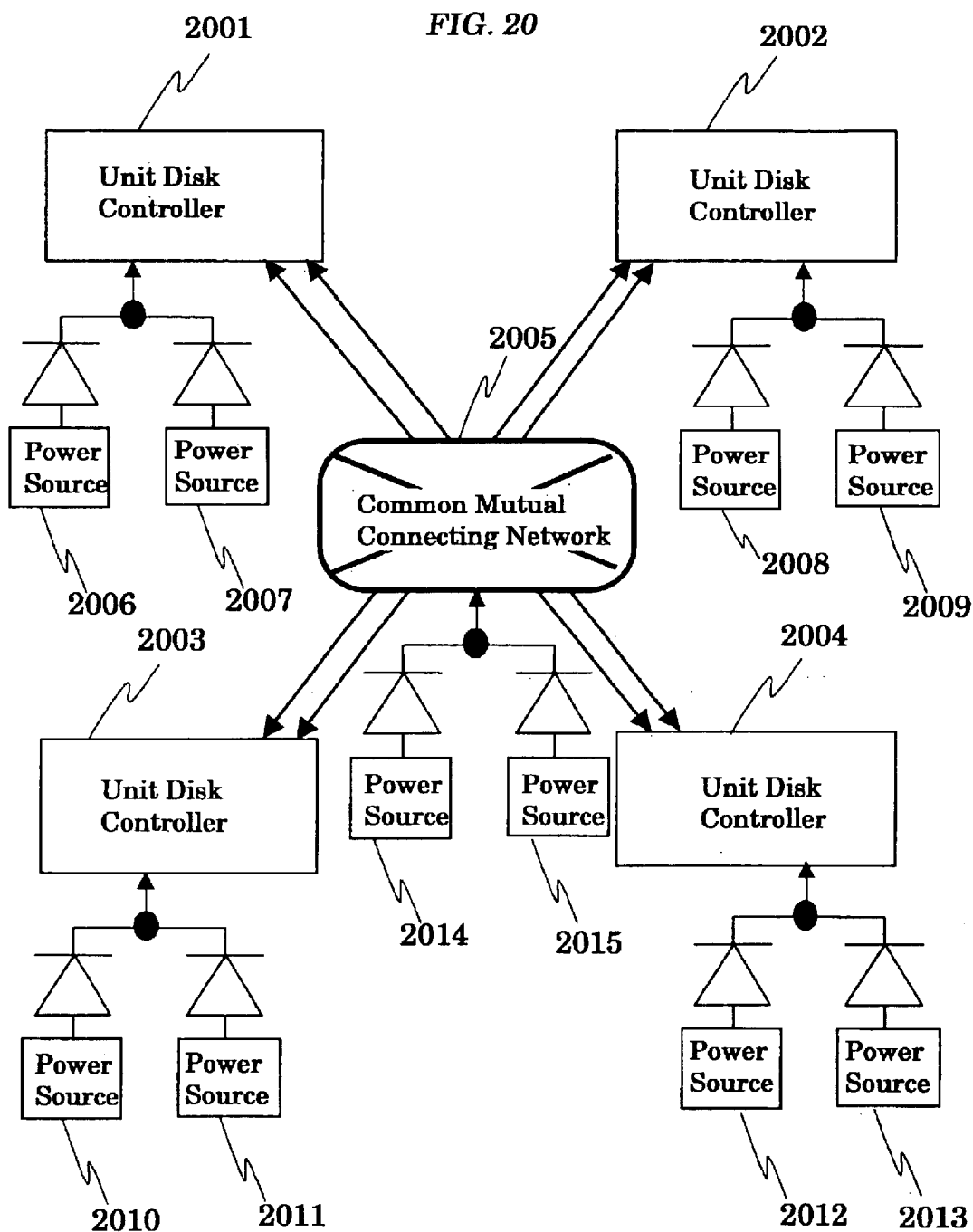
FIG. 20 is a schematic view showing one example of the power source redundancy construction of the entire disk controller in the present invention.

FIG. 20 is a schematic diagram showing one example of the power source redundancy construction of the entire disk controller of the present invention. Herein, a common mutual connecting network 2005 performs electric path control (switch, hub and others). Otherwise, the power source itself is unnecessary. Two of power sources 2006 to 2013 are supplied to each of unit disk controllers 2001 to 2004 and the common mutual connecting network 2005. In this way, when the redundant power sources are simply used for the respective parts, the number of the power sources is largest.

Figure 21:
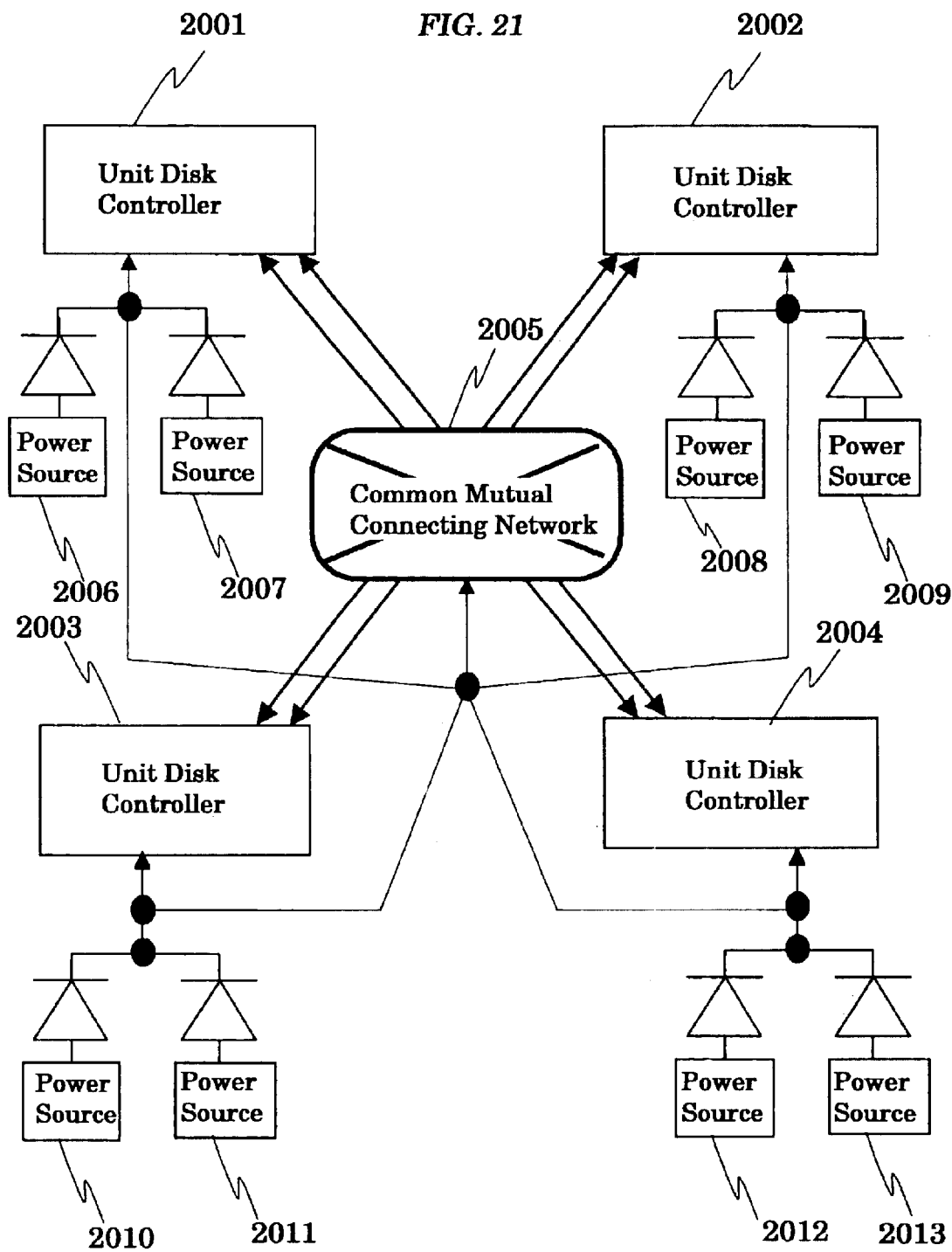
FIG. 21 is a diagram showing an example in which the power sources for use in the unit disk controllers connected to the common mutual connecting network are used to make the power source redundant in order to reduce the number of the power sources in FIG. 20.

FIG. 21 shows an example in which the power sources 2006 to 2013 for use in the unit disk controllers 2001 to 2004 connected to the common mutual connecting network 2005 are used to make the power source redundant in order to reduce the number of the power sources in FIG. 20.

Figure 1:
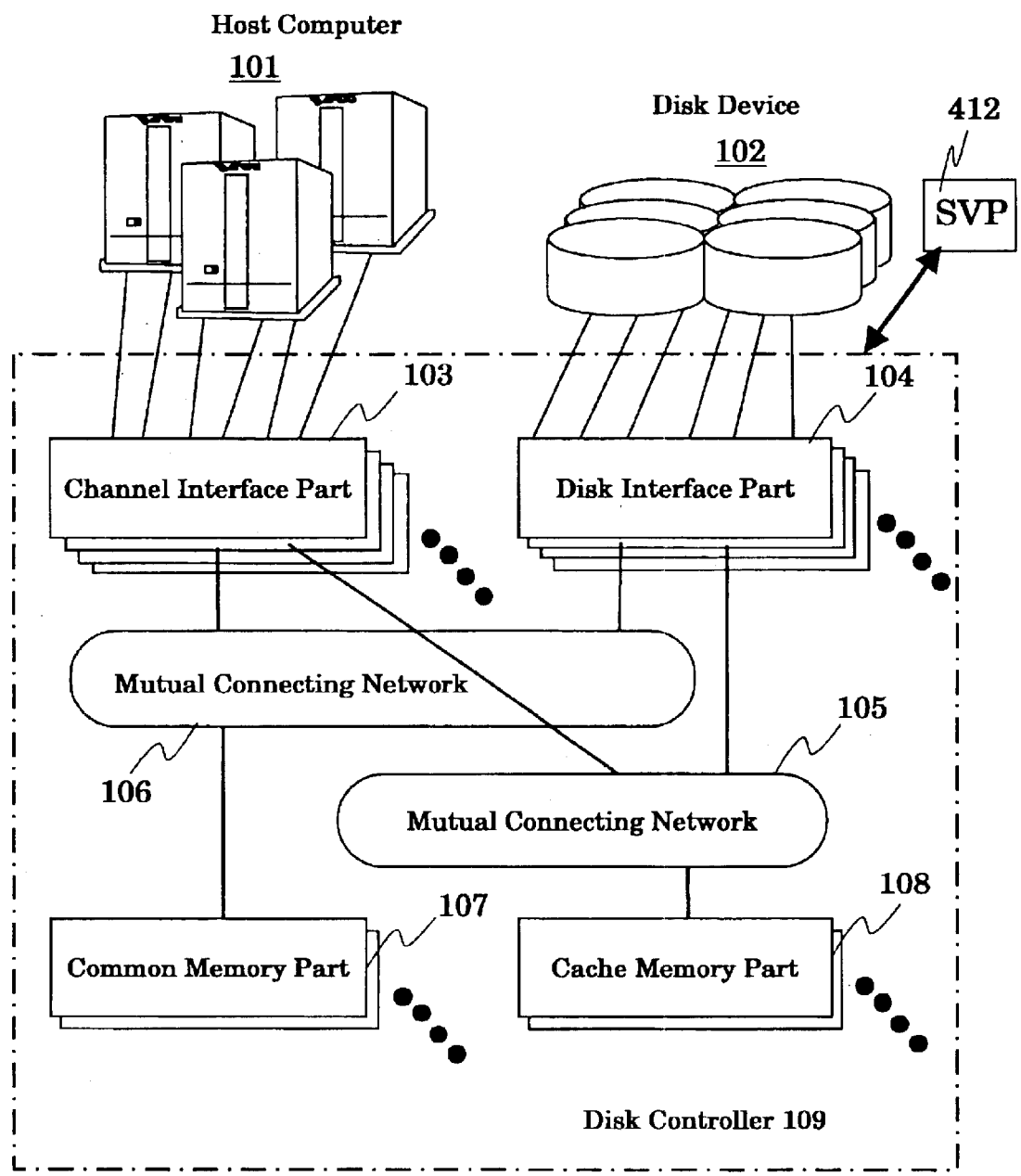
FIG. 1 is a diagram showing the overview of one example of a prior art construction of a computer system for which the present invention is intended.
Figure 2:
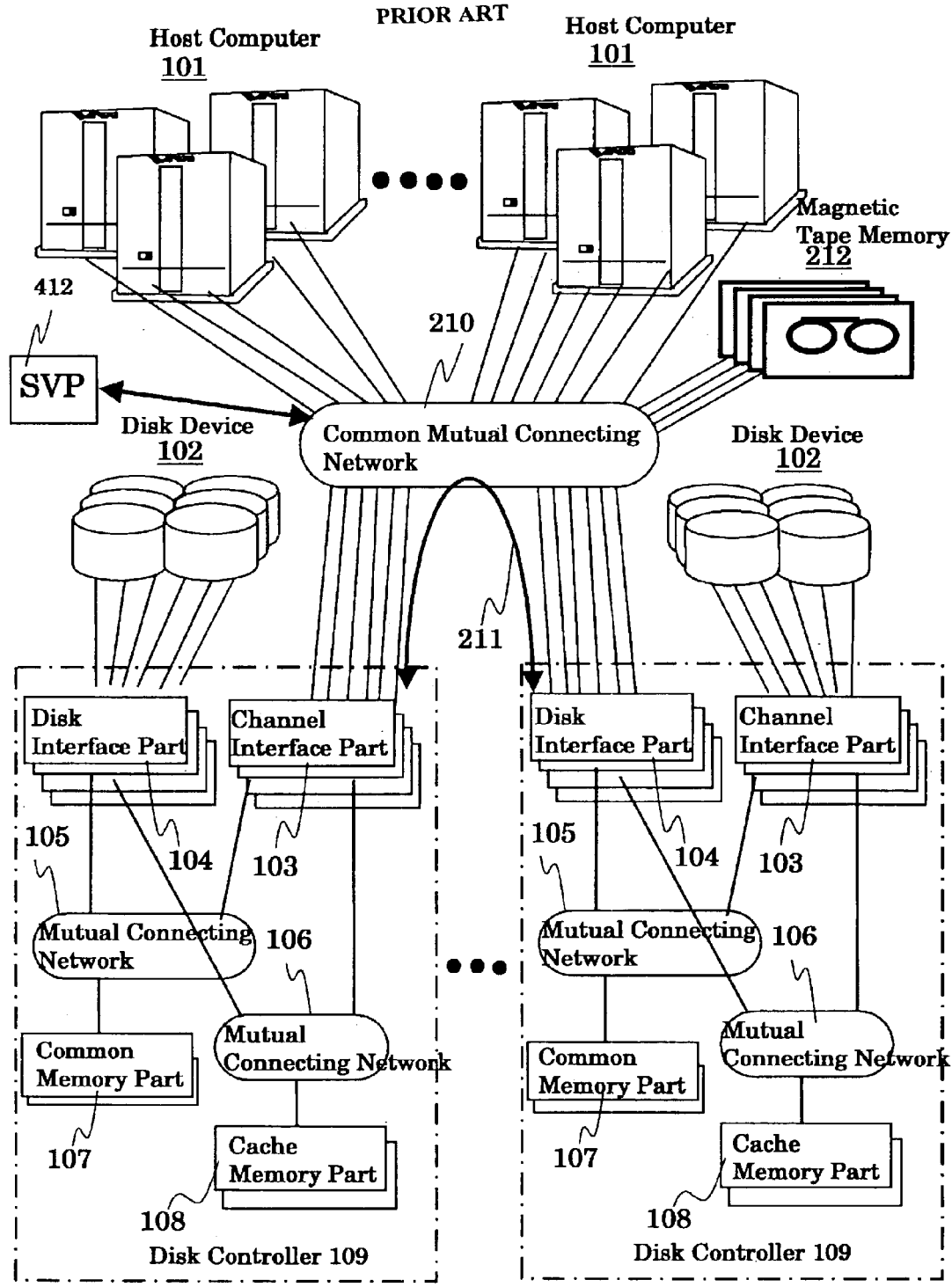
FIG. 2 is a diagram showing the overview of the construction example of a prior art disk array of the computer system for which the present invention is intended when the system construction is made efficient by an SAN environment.
Figure 3:
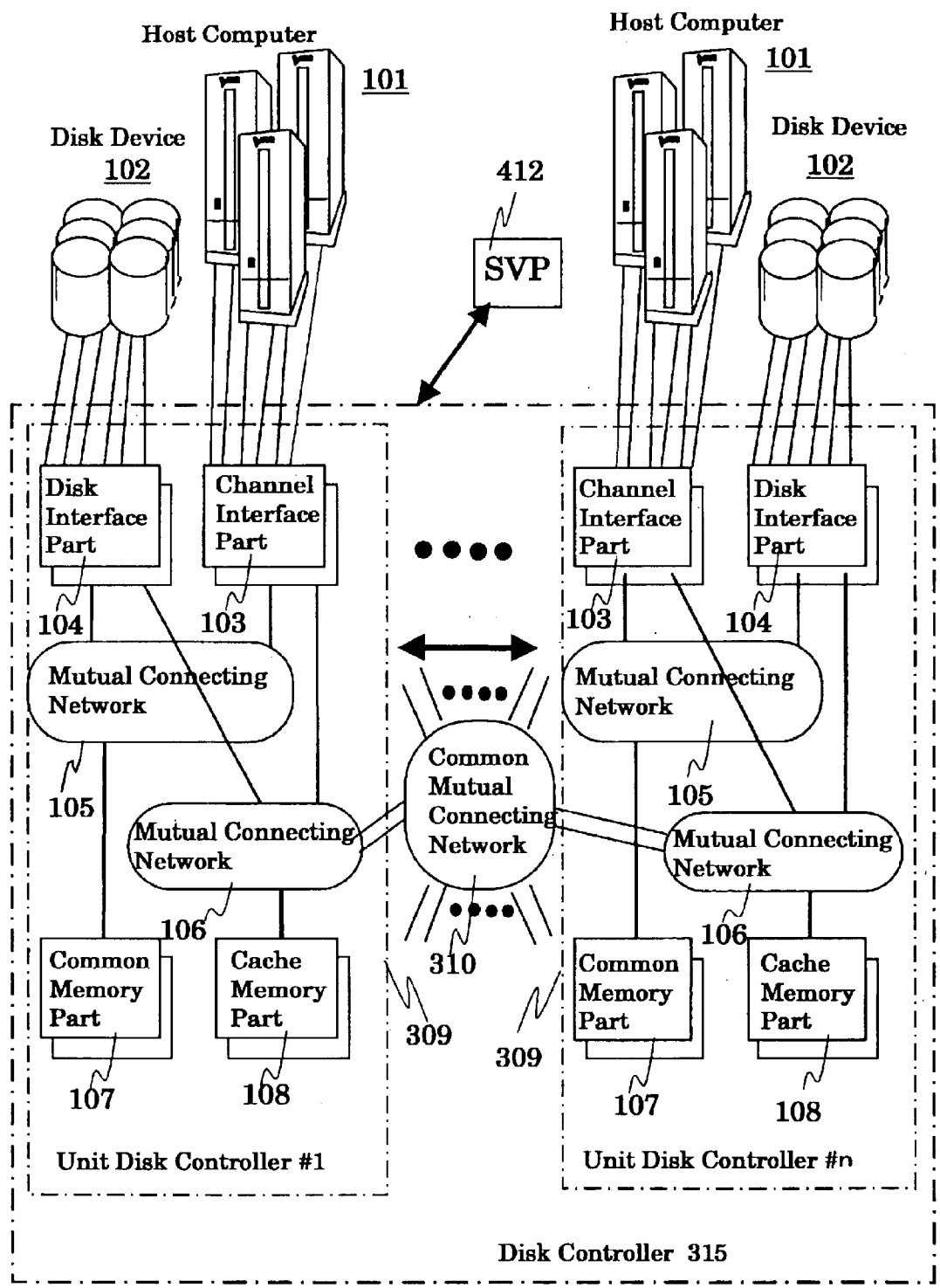
FIG. 3 is a diagram showing the overview of a prior art disk array with a construction such that prior art small disk controllers of the computer system for which the present invention is intended are connected by a common mutual connecting network.

FIG. 22 is a diagram showing one example of a method for mounting the redundant power sources of the construction in FIG. 21. FIG. 22 is an example in which four unit disk controllers 2202 to 2205 are mounted on one console 2201, two of these being arranged at upper and lower sides (FIG. 22(A)), and the double-stack construction is disposed so as to be faced in the back plane of the unit disk controller (FIG. 22(B)). As shown in FIG. 22(A), the unit disk controllers 2202 to 2205 are respectively provided with channel IF parts, disk IF parts, cash memory parts and common memory parts (see FIGS. 1 to 3) as well as with two power sources. These elements are mounted on back planes 2212 to 2215. The console 2201 is provided with a common mutual connecting network part 2208, and uses a connector 2209 of the common mutual connecting network part 2208 to connect the unit disk controllers, as explained in FIGS. 1 to 3, although the illustration thereof is omitted. A terminal 2209 of part of the connector is used as the power source introduction terminal of the common mutual connecting network part 2208. A power source is supplied in parallel from the power sources of the unit disk controllers 2202 to 2205 through a cable 2215. The relation between the positions of the respective parts herein has no special meaning. In the drawing, the unit disk controllers are connected to the common mutual connecting network part by the cable. However, the effects of the present invention cannot be changed when the respective parts are connected using a back plane.

The present invention can provide a device in which, when a plurality of unit disk controllers function as one disk controller by a common mutual connecting network, the cost can be reduced, and the effect of the number of the unit disk controllers can be effectively reflected to the performance.

There are various embodiments of the present invention as follows.

1. An operating service of a computer system comprising unit computer systems each having, as a unit, a construction comprising a host computer, a channel interface part having one or more processors for controlling the access of the host computer, a magnetic disk device, a disk interface part having one or more processors for controlling the access of the magnetic disk device, a cash memory part for storing data written/read between the host computer and the magnetic disk device, and a mutual connecting network having a function for interconnecting the channel interface part, the disk interface part, and the cash memory part, the unit computer systems being applied to the computer system so as to be connected by a common mutual connecting network connecting through the mutual connecting network, wherein an access status of the unit computer system by a logical path from the host computer through the common mutual connecting network to the magnetic disk device is monitored, the access statuses are summed up so as to suggest a system manager or an upper class device to change mapping of the logical path and the disk side path corresponding to the access number status for a predetermined period or timing.

2. An operating service of a computer system comprising unit computer systems each having, as a unit, a construction comprising a host computer, a channel interface part having one or more processors for controlling the access of the host computer, a magnetic disk device, a disk interface part having one or more processors for controlling the access of the magnetic disk device, a cash memory part for storing data written/read between the host computer and the magnetic disk device, and a mutual connecting network having a function for interconnecting the channel interface part, the disk interface part, and the cash memory part, the unit computer systems being applied to the computer system so as to be connected by a common mutual connecting network between means connecting the host computer and the channel interface part, wherein an access status of the unit computer system by a logical path from the host computer through the common mutual connecting network to the magnetic disk device is monitored, the access statuses are summed up so as to suggest a system manager or an upper class device to change mapping of the logical path and the disk side path corresponding to the access number status for a predetermined period or timing.

3. An operating service of a computer system comprising unit computer systems each having, as a unit, a construction comprising a host computer, a channel interface part having one or more processors for controlling the access of the host computer, a magnetic disk device, a disk interface part having one or more processors for controlling the access of the magnetic disk device, a cash memory part for storing data written/read between the host computer and the magnetic disk device, and a mutual connecting network having a function for interconnecting the channel interface part, the disk interface part, and the cash memory part, the unit computer systems being applied to the computer system so as to be connected by a first common mutual connecting network connecting through the mutual connecting network, and to be connected by a second common mutual connecting network between means connecting the host computer and the channel interface part, wherein an access status of the unit computer system by a logical path from the host computer through the common mutual connecting network to the magnetic disk device is monitored, the access statuses are summed up so as to suggest a system manager or an upper class device to change mapping of the logical path and the disk side path corresponding to the access number status for a predetermined period or timing.

4. The operating service of a computer system according to embodiment 1, wherein in place of the mapping change of the logical path and the disk side path, it is suggested that the logical volume accessed from the host computer to the magnetic disk device be copied and/or moved.

5. The operating service of a computer system according to embodiment 2, wherein in place of the mapping change of the logical path and the disk side path, it is suggested that the logical volume accessed from the host computer to the magnetic disk device be copied and/or moved.

6. The operating service of a computer system according to embodiment 3, wherein in place of the mapping change of the logical path and the disk side path, it is suggested that the logical volume accessed from the host computer to the magnetic disk device be copied and/or moved.

7. The operating service of a computer system according to embodiment 1, wherein, corresponding to the suggestion, an upper class device comprises means for managing the correspondence of a logical path with a logical volume accessed automatically executing mapping change of the logical path and/or copy and/or move of the logical volume accessed in accordance with the contents of the instruction of mapping change of the logical path from the disk controller and the disk side path and/or copy and/or move of the logical volume accessed.

8. The operating service of a computer system according to embodiment 2, wherein, corresponding to the suggestion, an upper class device comprises means for managing the correspondence of a logical path with a logical volume accessed automatically executing mapping change of the logical path and/or copy and/or move of the logical volume accessed in accordance with the contents of the instruction of mapping change of the logical path from the disk controller and the disk side path and/or copy and/or move of the logical volume accessed.

9. The operating service of a computer system according to embodiment 3, wherein, corresponding to the suggestion, an upper class device comprises means for managing the correspondence of a logical path with a logical volume accessed automatically executing mapping change of the logical path and/or copy and/or move of the logical volume accessed in accordance with the contents of the instruction of mapping change of the logical path from the disk controller and the disk side path and/or copy and/or move of the logical volume accessed.

10. The operating service of a computer system according to embodiment 1, wherein, with the suggestion, whether automatic instruction means for a procedure for executing mapping change of a logical path and/or copy and/or move of a logical volume accessed is started up or not is displayed and/or notified at the same time in accordance with the contents of the instruction of mapping change of the logical path from the disk controller and the disk side path and/or copy and/or move of the logical volume accessed.

11. The operating service of a computer system according to embodiment 2, wherein, with the suggestion, whether automatic instruction means for a procedure for executing mapping change of a logical path and/or copy and/or move of a logical volume accessed is started up or not is displayed and/or notified at the same time in accordance with the contents of the instruction of mapping change of the logical path from the disk controller and the disk side path and/or copy and/or move of the logical volume accessed.

12. The operating service of a computer system according to embodiment 3, wherein, with the suggestion, whether automatic instruction means for a procedure for executing mapping change of a logical path and/or copy and/or move of a logical volume accessed is started up or not is displayed and/or notified at the same time in accordance with the contents of the instruction of mapping change of the logical path from the disk controller and the disk side path and/or copy and/or move of the logical volume accessed.

What is claimed is:

1. A computer system comprising unit computer systems each having, as a unit, a construction comprising a host computer, a channel interface part having one or more processors for controlling the access of the host computer, a magnetic disk device having a logical volume, a disk interface part having one or more processors for controlling the access of the magnetic disk device, a cache memory part for storing data written/read between said host computer and said magnetic disk device, and a mutual connecting network having a function for interconnecting said channel interface part, said disk interface part, and said cache memory part, the unit computer systems being connected by a common mutual connecting network connecting through said mutual connecting network, the system computer having in its interior: means for monitoring an access status of said unit computer system by a logical path from the host computer through said common mutual connecting network to said logical volume of the magnetic disk device; and means for summing up the access statuses to display to a supervise processor or notify a system manager a result of summing up access statuses and a message of recommending movement of said logical volume of the magnetic disk device monitored when the result of summing up access statuses satisfies a predetermined condition for a predetermined period or timing.

2. The computer system according to claim 1, further comprising means for reporting to the upper class device in place of means for displaying to the supervise processor or notifying to the system manager the result of summing up access statuses and the message of recommending movement of said logical volume of the magnetic disk device and the logical path through said common mutual connecting network.

3. The computer system according to claim 1, wherein said unit computer systems are respectively connected by a common mutual connecting network comprising a plurality of independent connection lines.

4. The computer system according to claim 1, wherein each of said unit computer systems is driven by two independent power sources, and said common mutual connecting network is driven by a power source integrating said two independent power sources.

5. The computer system according to claim 1, wherein said host computer has a means to move said logical volume of magnetic disk device to an another magnetic disk device when the massage of recommending movement of said logical volume of magnetic disk device is issued so that said host computer access to the another magnetic disk device without said common mutual connecting network.

6. The computer system according to claim 1, wherein said host computer has a means to copy said logical volume of magnetic disk device to an another magnetic disk device when the massage of recommending movement of said logical volume of magnetic disk device is issued so that said host computer access to the another magnetic disk device without said common mutual connecting network.

7. A computer system comprising unit computer systems each having, as a unit, a construction comprising a host computer, a channel interface part having one or more processors for controlling the access of the host computer, a magnetic disk device having a logical volume, a disk interface part having one or more processors for controlling the access of the magnetic disk device, a cache memory part for storing data written/read between said host computer and said magnetic disk device, and a mutual connecting network having a function for interconnecting said channel interface part, said disk interface part, and said cache memory part, the unit computer systems being connected by a common mutual connecting network between means connecting said host computer and said channel interface part, the system computer having in its interior:

means for monitoring an access status of said unit computer system by a logical path from the host computer through said common mutual connecting network to said logical volume of the magnetic disk device; and means for summing up the access statuses to display to a supervise processor or notify a system manager a result of summing up access statuses and a message of recommending movement of said logical volume of the magnetic disk device monitored when the result of summing up access statuses satisfies a predetermined condition for a predetermined period or timing.

8. The computer system according to claim 7, further comprising means for reporting to the upper class device in place of means for displaying to the supervise processor or notifying to the system manager the result of summing up access statuses and the message of recommending movement of said logical volume of the magnetic disk device and the logical path through said common mutual connecting network.

9. The computer system according to claim 7, wherein said unit computer systems are respectively connected by a common mutual connecting network comprising a plurality of independent connection lines.

10. The computer system according to claim 7, wherein each of said unit computer systems is driven by two independent power sources, and said common mutual connecting network is driven by a power source integrating said two independent power sources.

11. The computer system according to claim 7, wherein said host computer has a means to move said logical volume of magnetic disk device to an another magnetic disk device when the massage of recommending movement of said logical volume of magnetic disk device is issued so that said host computer access to the another magnetic disk device without said common mutual connecting network.

12. The computer system according to claim 7, wherein said host computer has a means to copy said logical volume of magnetic disk device to an another magnetic disk device when the massage of recommending movement of said logical volume of magnetic disk device is issued so that said host computer access to the another magnetic disk device without said common mutual connecting network.

13. A computer system comprising unit computer systems each having, as a unit, a construction comprising a host computer, a channel interface part having one or more processors for controlling the access of the host computer, a magnetic disk device having a logical volume, a disk interface part having one or more processors for controlling the access of the magnetic disk device, a cash memory part for storing data written/read between said host computer and said magnetic disk device, and a mutual connecting network having a function for interconnecting said channel interface part, said disk interface part, and said cash memory part, the unit computer systems being connected by a first common mutual connecting network connecting through said mutual connecting network, and to be connected by a second common mutual connecting network between means connecting said host computer and said channel interface part, the system computer having in its interior:

means for monitoring an access status of said unit computer system by a logical path from the host computer through said first and second common mutual connecting networks to said logical volume of the magnetic disk device; and means for summing up the access statuses to display to a supervise processor or notify a system manager a result of summing up access statuses and a message of recommending change from access through said first mutual connecting network to access through said second mutual connecting network to said logical volume of the magnetic disk device monitored when the result of summing up access status satisfy a predetermined condition for a predetermined period or timing.

14. The computer system according to claim 13, further comprising means for reporting to the upper class device in place of means for displaying to the supervise processor or notifying to the system manager the result of summing up access statuses and a message of recommending movement of said logical volume of the magnetic disk device and the logical path through said common mutual connecting network.

15. The computer system according to claim 13, wherein said unit computer systems are respectively connected by a common mutual connecting network comprising a plurality of independent connection lines.

16. The computer system according to claim 13, wherein each of said unit computer systems is driven by two independent power sources, and said common mutual connecting network is driven by a power source integrating said two independent power sources.

17. The computer system according to claim 13, wherein said host computer has a means for changing said access to said logical volume of said host computer through said first mutual connecting network to access through said second mutual connecting network when the massage of recommending change of said mutual connecting network is issued.

18. A computer system comprising:

a plurality of host computers;

first and second storage systems having logical volume, each of which is connected to said host computers;

first connecting network being mutually connected between said host computers, first storage system and second storage system;

second connecting network being mutually connected between said first storage system and second storage system;

unit computer systems being connected to said first connecting network and said second connecting network, the system computer having in its interior: means for monitoring an access status of said unit computer system by a first logical path through said first storage system and said second connecting network from the host computer to said logical volume of said second storage system; and means for summing up the access statuses to display to a supervise processor a result of summing up access statuses and a message of recommending change from access through said first logical path to a second logical path, through which the host computer access to said logical volume of said second storage system, via said first connecting network when the result of summing up access statuses exceeds a predetermined condition for a predetermined period or timing.

19. The computer system according to claim 18, wherein said message is sent to said host computer.

20. The computer system according to claim 18, wherein said system computer instruct to changes from said first logical path to said second logical path to some devices included in the system computer when said message of recommending change is received.

21. The computer system according to claim 19, wherein said system computer instruct to changes from said first logical path to said second logical path to some devices included in the system computer when said message of recommending change is received.

* * * * *